United States Patent
Lee

(10) Patent No.: US 8,031,733 B2
(45) Date of Patent: Oct. 4, 2011

(54) HIGH SPEED ELECTRONIC DATA TRANSMISSION SYSTEM

(76) Inventor: John Kam Ho Lee, Hong Kong (CN)

( * ) Notice: Subject to any disclaimer, the term of this patent is extended or adjusted under 35 U.S.C. 154(b) by 606 days.

(21) Appl. No.: 12/001,725

(22) Filed: Dec. 12, 2007

(65) Prior Publication Data

US 2009/0160486 A1 Jun. 25, 2009

(30) Foreign Application Priority Data

Sep. 22, 2007 (AU) .............................. 2007905172

(51) Int. Cl.
*H04L 12/28* (2006.01)
*H04L 12/56* (2006.01)
*H03K 17/16* (2006.01)
*H03K 19/003* (2006.01)

(52) U.S. Cl. ............. 370/420; 370/419; 326/21; 326/30

(58) Field of Classification Search .................. 370/419; 398/135, 138; 326/21, 30
See application file for complete search history.

(56) References Cited

U.S. PATENT DOCUMENTS

| | | | | |
|---|---|---|---|---|
| 3,968,333 | A * | 7/1976 | Simokat et al. ............... | 379/413 |
| 4,745,598 | A * | 5/1988 | Ulug ............... | 370/455 |
| 4,916,393 | A * | 4/1990 | Crescini et al. ............... | 324/244 |
| 4,979,094 | A * | 12/1990 | Gemmell et al. ............... | 700/83 |
| 5,384,539 | A * | 1/1995 | Morbe et al. ................... | 324/527 |
| 5,814,808 | A * | 9/1998 | Takada et al. ............... | 250/206.1 |
| 5,818,949 | A * | 10/1998 | Deremer et al. ............... | 381/172 |
| 2007/0029645 | A1* | 2/2007 | Forbes et al. ................... | 257/659 |

FOREIGN PATENT DOCUMENTS

| | | |
|---|---|---|
| EP | 1646149 A | 4/2006 |
| JP | 2007 221600 A | 8/2007 |
| WO | WO 00/33489 A | 6/2000 |

OTHER PUBLICATIONS

Lewis D: "Making A Difference", new Electronics, International Thomson Publishing, London, GB, vol. 30, No. 18, Oct. 28, 1997, pp. 54/55.

* cited by examiner

*Primary Examiner* — Ayaz Sheikh
*Assistant Examiner* — Tarell Hampton
(74) *Attorney, Agent, or Firm* — Jackson Walker LLP

(57) ABSTRACT

A high-speed electrical data transmission system (10) includes a signal mixer (13) for receiving high-speed data from external network transceiver (12). The signal mixer (13) converts the data into an electrical current-fluctuating data signal. A signal processor (17) is located remotely of the signal mixer (13) and is connected electrically thereto by a simple/inexpensive cable (15) having only two operative conductors and receives the current-fluctuating data signal via the cable (15). The signal processor (17) converts the current-fluctuating data signal into a voltage-fluctuating data signal for distribution to a local area network.

3 Claims, 3 Drawing Sheets

Input Voltage Signal to Transistor Q1

Output Current Signal to be Transmitted to the Two-Wire Cable

Io  is static current for SIGNAL MIXER circuitry.
Is  is SIGNAL current.

Voltage Signal at the output of U1

HIGH SPEED ELECTRONIC DATA TRANSMISSION SYSTEM

BACKGROUND OF THE INVENTION

The present invention relates to a high-speed electrical data transmission system. The invention relates more particularly, although not exclusively, to a cost-effective system for electrically transmitting data in local area computer networks and other communications networks.

Modern methods of transmitting data signals by cable include fibre-optic communication, Low Voltage Differential Signalling (LVDS) and single ended signalling.

Fibre-optic systems are presently used to achieve high-speed data transmission over long distances. For example, high-speed broadband Internet and pay-TV networks and telephone networks have employed this technology. However, due to high costs of fibre-optic transceivers, the difficulty of splicing fibre-optic cables and the inability to convey electrical power in addition to data signals, fibre-optic networks have not extended the whole way to each end-connection point such as home or office modems, telephones or pay-TV receivers. Rather, the fibre-optic network extends to a fibre-optic transceiver "node" or "hub" employing optical-to-electrical (and vice versa) signal conversion and from which an electrical network extends to the various points of connection. For example, the signal from a fibre-optic transceiver having been converted into electrical voltage-fluctuation signals is connected by electrical cables to appliances such as home computers, telephones and pay-TV receivers in private premises and offices for example. For this reason, data signal from the fibre-optic transmission line to individual premises is by converting the optical signal into an electrical signal in a shared fibre-optic transceiver. The electrical signal is conveyed by LVDS transmission lines to electrical appliances such as personal computers (say in a local area network), telephones, cable televisions etc.

Although there have heretofore been disadvantages in the implementation of electrical cables from the transceiver to the various endpoints—particularly associated with cable length restrictions, there are advantages in adopting electrical cabling to transfer data and these include lower cable cost, ease of splicing electrical cables and the presence of existing in situ cable networks. Although LVDS transmission has replaced single-ended signalling transmission as it provides a higher data transfer rate and better resistance to electromagnetic interference, LVDS systems remain susceptible to electromagnetic interference and signal degradation over extended cable lengths.

OBJECTS OF THE INVENTION

It is an object of the present invention to overcome or substantially ameliorate at least one of the above disadvantages and/or more generally to provide an improved, cost-effective high-speed electrical data transmission system.

DISCLOSURE OF THE INVENTION

There is disclosed herein a high-speed electrical data transmission system, comprising:
a first signal mixer for receiving high-speed data and comprising means for converting said data into an electrical current-fluctuating data signal; and
a first signal processor located remotely of the first signal mixer and connected electrically thereto for receiving the current-fluctuating data signal and comprising means for converting the current-fluctuating data signal into a voltage-fluctuating data signal.

Preferably, the system further a cable comprising only two operative conductors connected between the first signal mixer and the first signal processor for carrying said current-fluctuating data signal.

Preferably, the system further comprises:
a transceiver located between the first signal mixer and an external network, the transceiver communicating a voltage-fluctuating data signal to the first signal mixer;
a second signal processor providing a voltage-fluctuating data signal to the transceiver.

Preferably, the voltage-fluctuating data signal provided by the first signal processor at said remote location is connected electrically to a network of one or more appliances, and wherein the system further comprises:
a second signal mixer at said remote location providing a current-fluctuating data signal and being connected electrically with said second signal processor for conversion of the current-fluctuating data signal thereby into said voltage-fluctuating data signal presented to the transceiver.

Preferably, the transceiver is a fibre-optic transceiver and wherein the external network is a fibre-optic network.

The present invention can convey high bandwidth data at a rate comparable to that of fibre-optic systems, yet has the cost advantage and ease of splicing advantage of LVDS systems without susceptibility to signal degradation to which the latter is prone. Furthermore, the present system can carry electrical power in addition to data transmission.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
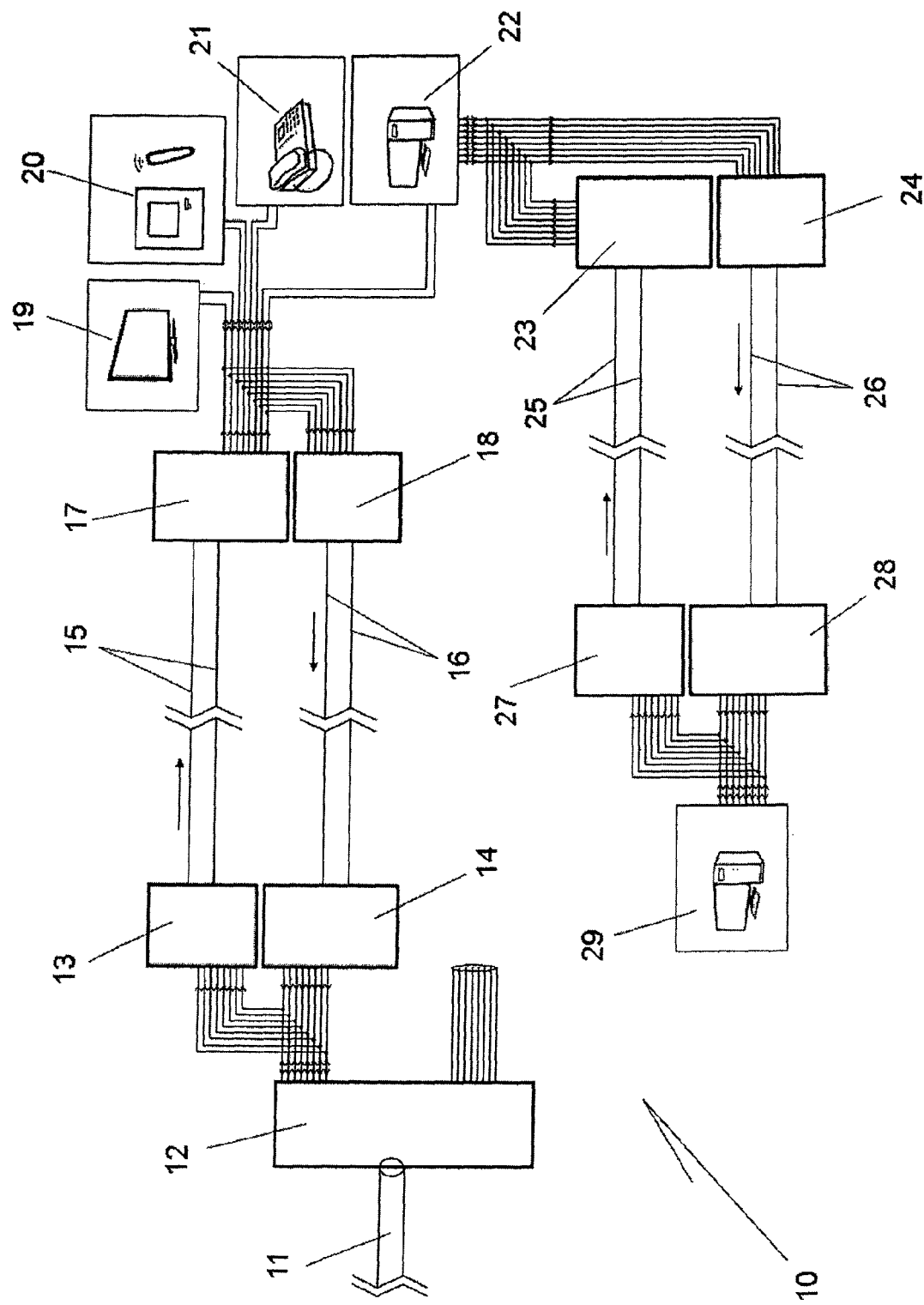
FIG. 1 is a schematic block diagram depicting a high-speed electrical data transmission system communicating data between a fibre-optic cable and a local network.

The block diagram of FIG. 1 depicts high-speed electrical data transmission system 10 communicating data between a fibre-optic public cable network 11 and a home or office local area network including for example a cable television receiver 19, home automation appliances 20, a telephone 21 and a personal computer 22. Of course some of these features could be omitted and others added. In an office local area network, the various components might include a computer server, numerous workstations, photocopiers, fax machines and the like.

The fibre-optic cable 11 would typically extend under the street or footpath and service numerous offices and/or premises. At each residence or office building for example, there is provided a fibre-optic transceiver 12 which converts optical data signals into electrical data signals.

Connected electrically to the transceiver 12 is a signal mixer 13 and signal processor 14. A two-conductor cable or "transmission line" 15 extends from the signal mixer 13 to a signal processor 17 inside the premises. The signal processor 17 would typically be housed in a plastics casing similar in style to an "external modem" or "broadband modem/hub". To enable duplex data transmission, the fibre-optic transceiver is connected electrically with another signal processor 14 which is in turn connected by a two-conductor transmission line cable 16 to another signal mixer 18 alongside signal processors 17. Signal processor 17 would typically be housed in the same "external modem" style housing and perhaps be integrated onto the same printed circuit board as signal processors 17. Indeed, signal mixer 13 and signal process 14 might also be integrated onto the same printed circuit board.

The signal mixer 13 converts a voltage-fluctuating signal from the fibre-optic transceiver into a current-fluctuating signal for transmission along the transmission line 15. The signal processor 17 detects current fluctuations in transmission line 15 and converts this back to voltage fluctuations. The voltage waveform produced by signal processor 17 matches the original voltage waveform communicated from the fibre-optic transceiver 12 to the signal mixer 13. From signal processor 17, the voltage fluctuation waveform is conveyed via the local network to the various components 19-22.

Furthermore, and in order to facilitate duplex communication, the electrical appliances or components and 19-22 transmit voltage-fluctuation signals to the signal mixer 18 which functions the same way as signal mixer 13—converting voltage fluctuations into current fluctuations for transmission along transmission line 16 to signal processor 14 for communication with the outside fibre-optic network via fibre-optic transceiver 12.

As a further extension of the invention, the home computer 22 can be connected to another signal processor/signal mixer pair 23, 24 for communication via a pair of electrical transmission lines 25 and 26 to a distant remote location whereat a further signal mixer/signal processor pair 27, 28 is connected to another computer 29. For example, appliances 19-22 might be located at the fifth floor of a high-rise office building, and the transmission lines 25 and 26 could extend to the twentieth floor of the same building whereat signal mixer 27, signal processor 28 and computer 29 are located.

Figure 2:
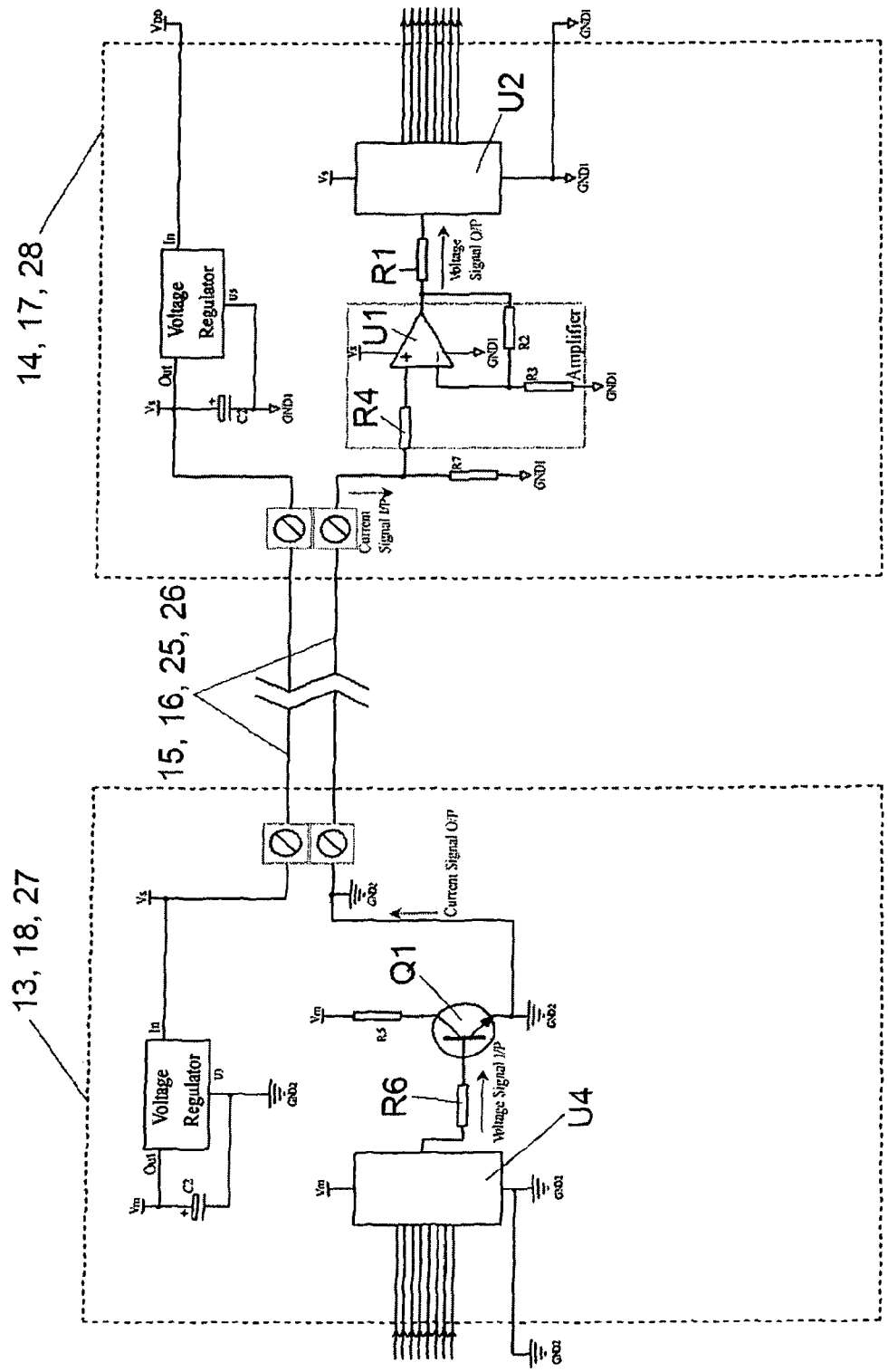
FIG. 2 is a schematic circuit diagram of the one of the signal mixers and one of the signal processors connected to one another by a two-conductor transmission line cable.

FIG. 2 is a detailed schematic wiring diagram of one of the signal mixers 13,18,27 and one of the signal processors 14,17, 28. The signal mixer receives DC power from an AC-to-DC power supply adapter or might alternatively receive DC supply voltage from an electrical appliance. The block identified as U4 is a parallel-to-serial semiconductor IC used to convert parallel input signals into serial signals emitted through resistor R6 to the base of transistor Q1. Transistor Q1 converts the voltage signals into electrical current signals and sends these through the two-conductor transmission line 15, 16, 25, 26 as the case may be.

At the signal processor the current-fluctuation signal passes through resistor R7 to ground and the amplifier U1 receives the current fluctuations ahead of resistor R7 via resistor R4. The amplifier U1 converts the transmission line current-fluctuation signal into a voltage-fluctuation signal and passes this via resistor R1 to the block identified as U2 which comprises a serial-to-parallel semiconductor IC for reversion of serial signals to parallel signals.

Figure 3A:
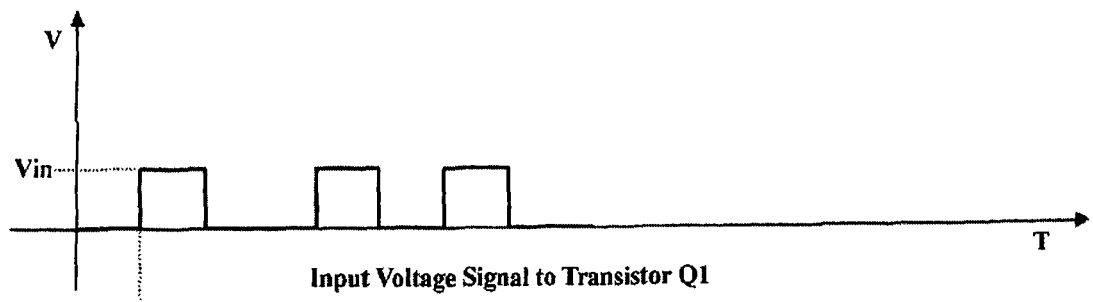
FIG. 3A is a graph showing a voltage signal waveform at the base of transistor Q1 in the signal mixer of FIG. 2.
Figure 3B:
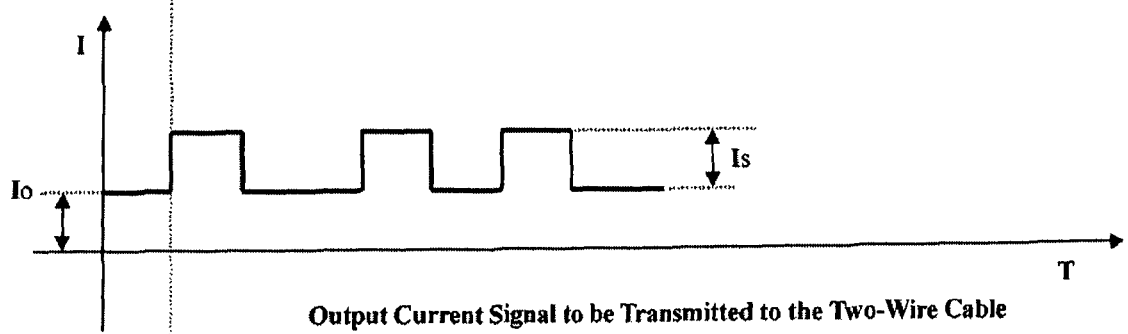
FIG. 3B is a graph showing the current signal waveform in the transmission line.
Figure 3C:
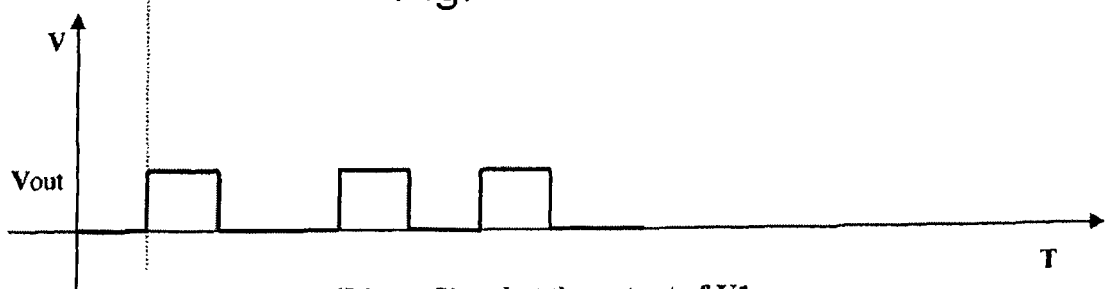
FIG. 3C is a graph showing the voltage output waveform of the amplifier U1 of the signal processor shown in FIG. 2.

As will be appreciated by reference to FIGS. 3A, 3B and 3C, the current signalling system of the present invention will produce a current signal waveform at the target end of the transmission line that is almost identical to the current waveform at the source. Line capacitance and inductance will affect a current signal waveform minimally and this compares favourably with degradation in the voltage waveform in LVDS systems resulting from line resistance and susceptibility to electromagnetic interference for example. An LVDS network having for example a 5V input at 100 mA and a line resistance of 10 ohms. The receiving end of the line will have a voltage amplitude of 4V representing a voltage distortion of 20%. With the present system of current signalling, a current of 100 mA at the sending end of the transmission line will present 100 mA (or a figure negligibly varied therefrom) at the target end of the transmission line—representing zero or negligible distortion. Furthermore, the present system has very high resistance to electromagnetic interference perceived by the transmission line itself. Indeed if a transmission line in an LVDS system is placed in close proximity to an AC motor supply line, the voltage signal waveform of the line suffers drastic distortion resulting from high back EMF from the motor winding.

Experimentation has shown that the transmission line of the present system suffers no detriment when placed in close proximity to a running AC motor. Furthermore, as the current signalling system of the present invention is less affected by line impedance, the signal waveform becomes less distorted compared with LVDS transmission. As a result, the choice of cable type for transmission line cabling adopted in the present system is left wide open. Even inexpensive Cat 1 cable (bell cable) can be used. For best performance however, the impedance of the cable should match or closely match the output impedance of the signal mixer and the input impedance of the signal processor.

It should be appreciated that modifications and alterations obvious to those skilled in the art are not to be considered as beyond the scope of the present invention. For example, the system is certainly not limited to connection to a fibre-optic transceiver. As coaxial cabling is also widely used to distribute signals over large distances.

The invention claimed is:

1. A high-speed electrical data transmission system, comprising:
    a first signal mixer for receiving high-speed data and comprising means for converting said data into a first electrical current-fluctuating data signal;
    a first signal processor located remotely of the first signal mixer and connected electrically thereto for receiving the first current-fluctuating data signal and comprising means for converting the first current-fluctuating data signal into a first voltage-fluctuating data signal;
    a transceiver located between the first signal mixer and a first external network, the transceiver communicating said high speed data to the first signal mixer;
    a second signal processor providing a second voltage-fluctuating data signal to the transceiver;
    the first signal processor being connected electrically to a second network of one or more appliances to communicate said first voltage-fluctuating data signal thereto; and
    wherein the system further comprises:
    a second signal mixer at said remote location providing a second current-fluctuating data signal and being connected electrically with said second signal processor, the second signal processor converting the second current-fluctuating data signal into said second voltage-fluctuating data signal presented to the transceiver.

2. The system of claim 1, comprising a cable comprising only two operative conductors connected between the first signal mixer and the first signal processor for carrying said first current-fluctuating data signal.

3. The system of claim 1, wherein the transceiver is a fibre-optic transceiver and wherein the external network is a fibre-optic network.

* * * * *